(12) United States Patent
Thibadeau (10) Patent No.: US 8,429,724 B2
(45) Date of Patent: Apr. 23, 2013

(54) VERSATILE ACCESS CONTROL SYSTEM

(75) Inventor: Robert H. Thibadeau, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 1804 days.

(21) Appl. No.: 11/410,702

(22) Filed: Apr. 25, 2006

(65) Prior Publication Data

US 2007/0250915 A1    Oct. 25, 2007

(51) Int. Cl.
*G06F 7/04* (2006.01)
(52) U.S. Cl.
USPC ............... 726/5; 726/19; 726/20; 726/27
(58) Field of Classification Search .................. None
See application file for complete search history.

(56) References Cited

U.S. PATENT DOCUMENTS

| | | | |
|---|---|---|---|
| 3,576,544 A | 4/1971 | Cordero, Jr. et al. | 340/172.5 |
| 3,890,601 A | 6/1975 | Pietrolewicz | 340/172.5 |
| 4,183,085 A | 1/1980 | Roberts et al. | 364/200 |
| 4,442,484 A | 4/1984 | Childs, Jr. et al. | 364/200 |
| 4,593,384 A | 6/1986 | Kleijne | |
| 5,012,514 A | 4/1991 | Renton | 380/4 |
| 5,022,077 A | 6/1991 | Bealkowski et al. | 380/4 |
| 5,027,401 A | 6/1991 | Soltesz | 380/54 |
| 5,101,374 A | 3/1992 | Sinutko, Jr. | 395/725 |
| 5,164,988 A | 11/1992 | Matyas et al. | |
| 5,345,590 A | 9/1994 | Ault et al. | 395/650 |
| 5,394,469 A | 2/1995 | Nagel et al. | 380/4 |
| 5,432,939 A | 7/1995 | Blackledge et al. | 395/700 |
| 5,448,045 A | 9/1995 | Clark | 235/382 |
| 5,504,814 A | 4/1996 | Miyahara | 713/200 |
| 5,600,805 A | 2/1997 | Fredericks et al. | 395/825 |
| 5,623,637 A | 4/1997 | Jones et al. | 395/491 |
| 5,754,821 A | 5/1998 | Cripe et al. | 395/491 |
| 5,754,938 A * | 5/1998 | Herz et al. | 725/116 |
| 5,787,498 A | 7/1998 | Lee et al. | |
| 5,809,546 A | 9/1998 | Greenstein et al. | 711/164 |
| 5,815,665 A * | 9/1998 | Teper et al. | 709/229 |
| 5,889,941 A | 3/1999 | Tushie et al. | |

(Continued)

FOREIGN PATENT DOCUMENTS

| | | |
|---|---|---|
| CN | 1567362 A | 1/2005 |
| CN | 1716221 A | 1/2006 |

(Continued)

OTHER PUBLICATIONS

TC Specification Architecture Overview, Specification Revision 1.2, Apr. 2004.

(Continued)

*Primary Examiner* — Kaveh Abrishamkar
(74) *Attorney, Agent, or Firm* — Cesari & Reed, LLP; Kirk A. Cesari (57) ABSTRACT

An access control system and method are provided, which include a plurality of authorities, a plurality of access control elements and an access control list. Each authority associates at least one of a plurality of proof of knowledge operations with at least one of a plurality of proof of knowledge credentials. Each access control element identifies a Boolean combination of at least one of the authorities. The access control list identifies one or more of the access control elements by which a method to be executed can be authenticated.

15 Claims, 4 Drawing Sheets

U.S. PATENT DOCUMENTS

| | | | | |
|---|---|---|---|---|
| 5,892,899 | A | 4/1999 | Aucsmith et al. | 395/186 |
| 5,892,902 | A | 4/1999 | Clark | 395/187.01 |
| 5,928,364 | A | 7/1999 | Yamamoto | 713/202 |
| 5,940,513 | A | 8/1999 | Aucsmith et al. | 380/25 |
| 5,949,601 | A | 9/1999 | Braithwaite et al. | 360/60 |
| 6,000,023 | A | 12/1999 | Jeon | 711/173 |
| 6,044,349 | A | 3/2000 | Tolopka et al. | 705/1 |
| 6,061,449 | A | 5/2000 | Candelore et al. | |
| 6,088,802 | A | 7/2000 | Bialick et al. | |
| 6,092,202 | A | 7/2000 | Veil et al. | 713/201 |
| 6,134,662 | A | 10/2000 | Levy et al. | 713/200 |
| 6,138,239 | A * | 10/2000 | Veil | 726/10 |
| 6,141,752 | A | 10/2000 | Dancs et al. | 713/172 |
| 6,157,984 | A | 12/2000 | Fisher et al. | 711/112 |
| 6,173,282 | B1 | 1/2001 | McCaughan et al. | |
| 6,173,402 | B1 | 1/2001 | Chapman | 713/182 |
| 6,175,924 | B1 | 1/2001 | Arnold | 713/200 |
| 6,182,222 | B1 | 1/2001 | Oparaji | 713/206 |
| 6,192,472 | B1 | 2/2001 | Garay et al. | 713/165 |
| 6,219,726 | B1 | 4/2001 | Ripberger | 710/36 |
| 6,219,771 | B1 | 4/2001 | Kikuchi et al. | 711/164 |
| 6,226,744 | B1 | 5/2001 | Murphy et al. | |
| 6,253,281 | B1 | 6/2001 | Hall | 711/112 |
| 6,268,789 | B1 | 7/2001 | Diamant et al. | 340/5.74 |
| 6,269,409 | B1 | 7/2001 | Solomon | 709/329 |
| 6,321,358 | B1 | 11/2001 | Anderson | 714/763 |
| 6,324,627 | B1 | 11/2001 | Kricheff et al. | 711/163 |
| 6,330,653 | B1 | 12/2001 | Murray et al. | 711/173 |
| 6,336,187 | B1 | 1/2002 | Kern et al. | 713/161 |
| 6,360,945 | B1 | 3/2002 | Drew | 235/382 |
| 6,421,779 | B1 | 7/2002 | Kuroda et al. | |
| 6,438,690 | B1 | 8/2002 | Patel et al. | |
| 6,446,209 | B2 | 9/2002 | Kern et al. | 713/193 |
| 6,468,160 | B2 | 10/2002 | Eliott | |
| 6,647,481 | B1 | 11/2003 | Luu et al. | 711/206 |
| 6,650,492 | B2 | 11/2003 | Lenny et al. | 360/31 |
| 6,691,198 | B1 | 2/2004 | Hamlin | 710/305 |
| 6,691,226 | B1 | 2/2004 | Frank, Jr. et al. | 713/100 |
| 6,707,548 | B2 | 3/2004 | Kreimer et al. | |
| 6,711,605 | B2 | 3/2004 | Sekiguchi et al. | 709/1 |
| 6,715,073 | B1 | 3/2004 | An et al. | |
| 6,820,063 | B1 | 11/2004 | England et al. | |
| 6,836,853 | B1 | 12/2004 | Dover et al. | |
| 6,854,039 | B1 | 2/2005 | Strongm et al. | 711/163 |
| 6,871,278 | B1 | 3/2005 | Sciupac | |
| 6,889,329 | B1 | 5/2005 | DiGiorgio et al. | |
| 6,892,383 | B1 | 5/2005 | Arndt | 718/1 |
| 6,915,402 | B2 | 7/2005 | Wilson et al. | |
| 6,957,364 | B2 | 10/2005 | Shimooka et al. | 714/25 |
| 6,986,052 | B1 | 1/2006 | Mittal | |
| 7,036,020 | B2 | 4/2006 | Thibadeau | |
| 7,046,805 | B2 | 5/2006 | Fitzhardinge et al. | |
| 7,085,931 | B1 | 8/2006 | Smith et al. | |
| 7,114,051 | B2 | 9/2006 | Guu et al. | |
| 7,124,301 | B1 | 10/2006 | Uchida | |
| 7,155,616 | B1 | 12/2006 | Hamlin | |
| 7,178,034 | B2 | 2/2007 | Cihula et al. | |
| 7,228,243 | B2 | 6/2007 | Brenner | |
| 7,336,789 | B1 | 2/2008 | Mooij et al. | |
| 7,356,665 | B2 | 4/2008 | Rawson, III | |
| 7,426,747 | B2 | 9/2008 | Thibadeau | |
| 7,461,270 | B2 | 12/2008 | Thibadeau | |
| 7,539,890 | B2 | 5/2009 | Thibadeau | |
| 7,600,129 | B2 | 10/2009 | Libin et al. | |
| 2001/0052073 | A1 | 12/2001 | Kern et al. | |
| 2002/0069169 | A1 | 6/2002 | Sukeda et al. | |
| 2002/0077177 | A1 | 6/2002 | Elliott | 463/40 |
| 2002/0108051 | A1 | 8/2002 | Fougeroux et al. | |
| 2002/0136406 | A1 | 9/2002 | Fitzhardinge et al. | 380/210 |
| 2002/0157010 | A1 | 10/2002 | Dayan et al. | 713/191 |
| 2002/0178337 | A1 | 11/2002 | Wilson et al. | 711/173 |
| 2003/0023867 | A1 | 1/2003 | Thibadeau | 713/200 |
| 2003/0046472 | A1 | 3/2003 | Morrow | |
| 2003/0084168 | A1 | 5/2003 | Erickson et al. | |
| 2003/0225960 | A1 | 12/2003 | Guu et al. | 711/103 |
| 2004/0073795 | A1 | 4/2004 | Jablon | |
| 2004/0088513 | A1 | 5/2004 | Biessener et al. | 711/173 |
| 2004/0128500 | A1 | 7/2004 | Cihula et al. | |
| 2005/0066191 | A1 | 3/2005 | Thibadeau | 713/200 |
| 2005/0160151 | A1 | 7/2005 | Rawson, III | 709/213 |
| 2005/0177698 | A1 | 8/2005 | Ku et al. | |
| 2005/0177714 | A1 | 8/2005 | Jeong et al. | |
| 2005/0197859 | A1 | 9/2005 | Wilson et al. | |
| 2005/0210266 | A1 | 9/2005 | Cottrell et al. | |
| 2005/0268114 | A1 | 12/2005 | Thibadeau | |
| 2006/0031301 | A1 * | 2/2006 | Herz et al. | 709/206 |
| 2006/0174352 | A1 | 8/2006 | Thibadeau | |
| 2007/0174920 | A1 | 7/2007 | Thibadeau | |
| 2007/0250710 | A1 | 10/2007 | Thibadeau | |
| 2007/0250734 | A1 | 10/2007 | Thibadeau | |
| 2007/0250915 | A1 | 10/2007 | Thibadeau | |
| 2008/0215306 | A1 | 9/2008 | Lidji et al. | |
| 2009/0235109 | A1 | 9/2009 | Thibadeau | |

FOREIGN PATENT DOCUMENTS

| | | | |
|---|---|---|---|
| EP | 0 965 903 | A1 | 12/1999 |
| JP | 2041550 | A | 2/1990 |
| JP | 5134863 | A2 | 6/1993 |
| JP | 5134895 | A | 6/1993 |
| JP | 8115266 | A2 | 5/1996 |
| JP | 10097445 | A | 4/1998 |
| JP | 10097446 | A | 4/1998 |
| JP | 2001175354 | A | 6/2001 |
| JP | 02100118 | A | 4/2002 |
| JP | 2002100118 | A | 4/2002 |
| JP | 2003091704 | A | 3/2003 |
| JP | 2004199410 | A | 7/2004 |
| JP | 2004303095 | A | 10/2004 |
| JP | 08287020 | A | 11/2008 |
| JP | 2008287020 | A | 11/2008 |
| JP | 2010097445 | A | 4/2010 |
| WO | WO 99/59049 | | 11/1999 |
| WO | 0013073 | A1 | 3/2000 |
| WO | 0180190 | A1 | 10/2001 |
| WO | 0195273 | A1 | 12/2001 |

OTHER PUBLICATIONS

"Initializing the CryptoMemory® Device for Smart Card Applications, Atmel Crypto Memory® Application Note," Atmel Corporation, 2003, pp. 1-12.

"TCPA PC Specific Implementation Specification," Version 1.00, Booklet, Sep. 9, 2001. pp. 1-70.

Gobioff, H. et al.; "Security for Network Attached Storage Devices," School of Computer Science, Carnegie Mellon University, Oct. 23, 1997. pp. 1-18.

"Trusted Computing Platform Alliance (TCPA)", Main Specification Version 1.1a, Booklet, Nov. 12, 2001, pp. 1-321.

"Intel® Protected Access Architecture," Application Interface Specification Revision 1.0, Booklet, Mar. 2001. pp. 1-128.

Strunk, J.D. et al.; "Self-Security Storage: Protecting Data in Compromised Systems," 4th Symposium on Operating Sytems Design and Implementation, Oct. 2000, pp. 1-15.

Tao et al., W.; "Research on a Dedicated CPU Architecture for Java IC Card," ACTA Electronica Sinica, vol. 28, No. 11, Nov. 2000, pp. 77-80, 76. Chinese Inst. Electron, China.

"Public Protection of Software," ACM Transactions on Computer Systems, vol. 5, No. 4, Nov. 1987, pp. 371-393.

Saltzer, Jerome H., "Protection and Control of Information Sharing in Multics," Communications of the ACM, vol. 17, No. 7, Jul. 1974.

Wilkes, M.V.; "Hardware Support for Memory Protection: Capability Implementations,", Digital Equipment Corporation, ACM 1982, pp. 108-116.

Brenner, R.; "Smart Cards with Built-In Microprocessors: Partition into Virtual Cards," Elektronik, vol. 43, No. 9, May 3, 1994 pp. 38-44, Germany.

"SECUR'ACCes: access control with the CP8 smart card", SECURICOM 87, 5th Worldwide Congress on Computer and Communications Security and Protection.SEDEP. 1987, pp. 187-196, Paris, France.

"Memory Protection Software Facility for OS/2 Shared Data Applica-tions", IBM Technical Disclosure Bulletin, pp. 81-89, Sep. 1991.

"Modular System Partition," IBM Technical Disclosure Bulletin, pp. 341-342, Dec. 1992.

"Preventing Access to a Personal Computer," IBM Technical Disclosure Bulletin, pp. 98-100, Sep. 1992.

"Password Protection of Separate Hard Disk Partitions," IMB Technical Disclosure Bulletin, pp. 103-104, Nov. 1996.

"TCPA Security and Internet Business: Vital Issues for IT", The Trusted Computing Platform Alliance, Aug. 2000, pp. 1-11.

Office Action Dated Dec. 30, 2009 of U.S. Appl. No. 11/410,453, filed Apr. 25, 2006.

"Protection and Control of Information Sharing in Multics" Communications of the ACM, vol. 17, No. 7, Jul. 1974.

Notice of Allowance dated Jan. 14, 2009 for corresponding U.S. Appl. No. 11/410,447, filed Apr. 25, 2006.

Japanese Office Action dated Sep. 15, 2009 for corresponding Japanese Application No. 2007-114174.

Korean Intellectual Property Tribunal Trial Decision dated Sep. 3, 2010 for corresponding Korean Application No. 10-2007-0040214.

Office Action dated Jun. 29, 2010 for corresponding U.S. Appl. No. 11/410,453, filed Apr. 25, 2006.

Office Action dated Dec. 30, 2009 for corresponding U.S. Appl. No. 11/410,453, filed Apr. 25, 2006.

Final Office Action dated Dec. 3, 2010 for corresponding U.S. Appl. No. 11/410,453, filed Apr. 25, 2006.

\* cited by examiner

METHOD TABLE

| TYPE | NAME | ID | COMMON NAME | SCRIPT | ACL | LOG |
|------|------|-----|-------------|--------|------|-----|
|      | GET  | 1   |             | PROG1  | ACE1 |     |
|      | SET  | 2   |             | PROG2  | ACE2 |     |
|      |      |     |             |        |      |     |
|      |      |     |             |        |      |     |
|      |      |     |             |        |      |     |

260 → TYPE row
261 → GET row
261 → SET row

VERSATILE ACCESS CONTROL SYSTEM

CROSS-REFERENCE TO RELATED APPLICATIONS

Cross-reference is hereby made to U.S. application Ser. No. 11/410,447, entitled "HYBRID COMPUTER SECURITY CLOCK" and U.S. application Ser. No. 11/410,453, entitled "VERSATILE SECURE AND NON-SECURE MESSAGING, which were filed on even date herewith and are hereby incorporated by reference.

Cross-reference is also made to copending U.S. Patent Applications: Ser. No. 09/912,931, filed Jul. 25, 2001 and entitled "METHODS AND SYSTEMS FOR PROMOTING SECURITY IN A COMPUTER SYSTEM EMPLOYING ATTACHED STORAGE DEVICES"; Ser. No. 10/963,373, filed Oct. 12, 2004 and entitled "SYSTEM AND METHOD FOR DELIVERING VERSATILE SECURITY, DIGITAL RIGHTS MANAGEMENT, AND PRIVACY SERVICES FROM STORAGE CONTROLLERS"; Ser. No. 10/984,368, filed Nov. 9, 2004 and entitled "SYSTEM is AND METHOD FOR DELIVERING VERSATILE SECURITY, DIGITAL RIGHTS MANAGEMENT, AND PRIVACY SERVICES"; Ser. No. 11/178,908, filed Jul. 11, 2005 and entitled "METHODS AND SYSTEMS FOR PROMOTING SECURITY IN A COMPUTER SYSTEM EMPLOYING ATTACHED STORAGE DEVICES"; Ser. No. 11/343,338, filed Jan. 31, 2006 and entitled "METHOD AND APPARATUS FOR PROVIDING VERSATILE SERVICES ON STORAGE DEVICES"; and Ser. No. 11/346,118, filed Feb. 2, 2006 and entitled "METHODS AND SYSTEMS FOR PROMOTING SECURITY IN A COMPUTER SYSTEM EMPLOYING ATTACHED STORAGE DEVICES".

FIELD OF THE DISCLOSURE

The present disclosure generally relates to access control systems and methods such as those used for securing computer systems.

BACKGROUND OF THE DISCLOSURE

Generally, access control systems limit who or what can execute methods on objects. Permission to execute a method on an object is governed by which secrets or information a host application has proven that it knows. For example, in normal log on systems, the host application acts as an interface between the user and the client application that the user desires to access (such as reading a file). Typical access control systems are limited to particular types of authentication protocols, such as a password, a public key challenge/response, a symmetric key challenge/response, or a keyed-hash message authentication code (HMAC).

These protocols are often fixed to a single type of authentication by the operating system or the firmware of the device being accessed. As a result, access control systems are typically limited to a single or limited number of authentication protocols and have limited flexibility.

Improved access control systems and methods are therefore desired, which could provide increased versatility and extensibility to many different authentication protocols.

Various embodiments of the present invention address these problems, and offer other advantages over the prior art.

SUMMARY

One embodiment of the present invention is directed to an access control system, which includes a plurality of authorities, a plurality of access control elements and an access control list. Each authority associates at least one of a plurality of proof of knowledge operations with at least one of a plurality of proof of knowledge credentials. Each access control element identifies a Boolean combination of at least one of the authorities. The access control list identifies one or more of the access control elements by which a method to be executed can be authenticated.

Another embodiment of the present invention is directed to an access control system, which includes a credential table, an authority table and an access control element table. The credential table includes a plurality of proof of knowledge credentials that can be proven by at least one of a plurality of proof of knowledge operations. The authority table identifies a plurality of authorities and for each authority, associates at least one of the proof of knowledge operations with at least one of the proof of knowledge credentials. The access control element table identifies a plurality of access control elements and for each access control element, identifies a Boolean combination of at least one of the authorities.

Another embodiment of the present invention is directed to a method, which includes: maintaining a plurality of authorities, each authority associating at least one of a plurality of proof of knowledge operations with at least one of a plurality of proof of knowledge credentials; and maintaining a plurality of access control elements, each access control element identifying a Boolean combination of at least one of the authorities, the plurality of authorities and the plurality of access control elements being maintained at least in part within a memory associated with a device for which access is controlled.

Another embodiment of the present invention is directed to a computer readable medium having a tangible component with instructions. When the instructions are executed by a computing device, the instructions cause the computing device to perform steps including: maintaining a plurality of authorities, each authority associating at least one of a plurality of proof of knowledge operations with at least one of a plurality of proof of knowledge credentials; and maintaining a plurality of access control elements, each access control element identifying a Boolean combination of at least one of the authorities, the plurality of authorities and the plurality of access control elements being maintained at least in part within a memory associated with a device for which access is controlled.

Other features and benefits of one or more embodiments of the present invention will be apparent upon reading the following detailed description and review of the associated drawings.

DETAILED DESCRIPTION OF ILLUSTRATIVE EMBODIMENTS

The present disclosure provides a description of a compact but versatile access control system and method for embedded applications, for example, and which are highly extensible. The system and method are more flexible than simple username/password logons, and can incorporated an indefinitely large number of other proof of knowledge methods within a single access control framework.

In one or more embodiments, the access control system and method are embedded within the firmware of a peripheral device being accessed, such as within a graphics controller or a storage device controller. The access control system and method allow a set of policies to be defined for features and resources in dedicated controllers, for example. The system and method are embedded as a feature or resource inside the peripheral device controller. The system and method provide a mechanism that allows a user to flexibly define authentication using many different kinds of authorities by implementing the authentication process through a series of simple access control tables that can be easily defined for a particular application.

For example, the access control system can include a set of Credential tables, an Authority table and an Access Control Element (ACE) table. The Credential tables each include a plurality of proof of knowledge credentials that can be proven by at least one of a plurality of proof of knowledge operations, known as Authentication Methods, Authentication Operations or Protocol Operations. The Authority table identifies a plurality of Authorities and for each Authority, associates at least one of the proof of knowledge operations (Authentication Operations) with at least one of the proof of knowledge Credentials. The ACE table identifies a plurality of ACEs and for each ACE, identifies a Boolean combination of at least one of the Authorities.

Each "method" that makes use of any resource or feature on or associated with a peripheral device can have an associated Access Control List (ACL), which identifies one or more of the ACEs by which the method to be executed can be authenticated. Once authenticated, the method is permitted to execute.

The access control system can be implemented for any peripheral of a computing device, for example. As used herein, "computing device" includes, but is not limited to, desk top computer systems, laptop computer system, networked computer systems, wireless systems such as cellular phones and PDA's, digital cameras including self-contained web-cams, storage devices, and/or any reasonable combination of these or other systems and devices.

Figure 1:
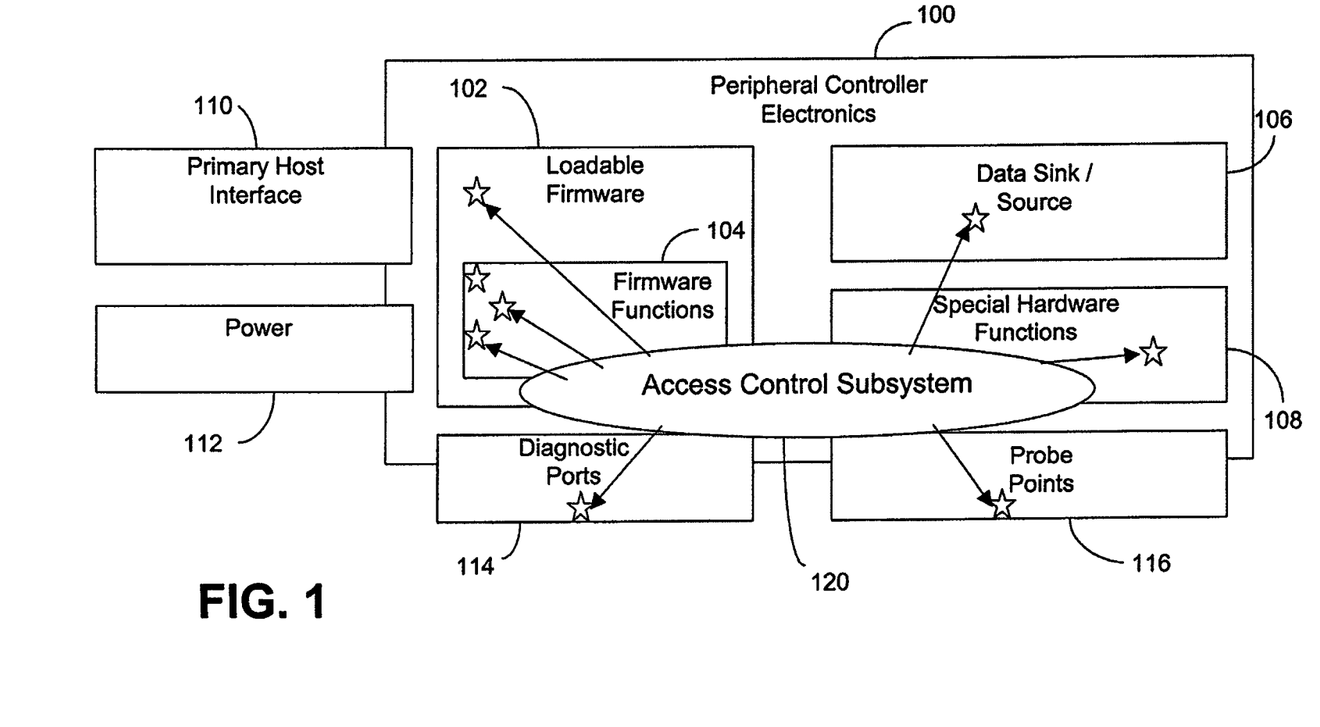
FIG. 1 is a block diagram of a pheripheral controller having an access control system according to an embodiment of the present invention.

FIG. 1 is a block diagram illustrating a general risk model for a peripheral device in which an access control subsystem 102 according to an embodiment of the present invention can be used. The peripheral device has peripheral controller electronics block 100, including loadable firmware 102 with firmware functions 104, a data sync/source 106 and special hardware functions 108. The general risk model for a peripheral device typically has four major channels of attack on the device. These channels include a primary host interface 110, a power interface 112, diagnostics ports 114 and probe points 116. As described in more detail below, access control subsystem 120 can be embedded into the loadable firmware 102 of peripheral controller electronics 100 to provide versatile access control over these points of vulnerability and over the features and resources of the peripheral device.

1. ACCESS CONTROL

At least one Security Provider (SP) is generated for each peripheral device for which access to the SP may be controlled, for example as described in U.S. Patent Application Publication US2003/0023867, published Jan. 30, 2003. An SP includes, for example, an atomic collection of access control Tables and Methods that can be issued in a peripheral device on behalf of a host software provider. A host software provider includes any device or process, such as a software application, that is directly or indirectly coupled to the peripheral device and desires access to make use of a resource or feature on or associated with the peripheral device.

Access Control limits who or what can execute methods on a Security Provider, an access control table, or even on specific rows and columns of a table. The term "Method" is used herein to refer to the actions that the host application desires to perform that makes use of a resource or feature of the peripheral device and to which one or more authorities are attached. For example, Method calls to an SP can include a Get (get a value), a Set (set a value), Unlock (e.g. unlock a serial port), etc. These Methods can be directed to actions on an access control table maintained by the SP and actions on other peripheral resources governed by the SP, such as actions on data storage media.

Permission to execute a Method is governed by which secrets the invoker has proven that it knows. The secrets and their public parts are called Credentials. As mentioned above, the operation for proving knowledge of a secret is called an Authentication Method or Authentication Operation. The actual proving of knowledge of a secret is called Authentication.

In one embodiment, the access control system is implemented in simple tables of three types, a table of Access Control Elements (ACEs), a table of Authorities, and a set of tables of Credentials. The "secrets" or information of which knowledge is to be proven are stored in the Credential tables.

1.1 Access Control Lists (ACLs)

Access Control is specified in layers. The top layer of the mechanism is Access Control Lists (ACLs). ACLs are lists of Access Control Elements (ACEs). This layering gives the host a way in which it can delegate control of an ACL, via control of its ACEs, to various independent entities. In one embodiment, an ACL is implemented as a token list of a predetermined number of bytes. It represents an ACE expression in postfix notation, wherein the logical operators AND, OR, and NOT are encoded as the integers −1, −2, and −3.

With ACEs as the building blocks of ACLs, each ACE can have separate managerial control. For example, one Authority might create a Table and give another Authority control of some of the ACEs on it. This allows flexible, fine-grained management of access.

The simplest ACL is one ACE of one Authority. The minimum and maximum number of ACEs in an ACL and the minimum and maximum number of Authorities in an ACE is device specific.

1.2 Access Control Elements (ACEs)

ACEs are Boolean combinations of Authorities. This permits the ACE to express cross-certification or other forms of restriction. When an Authority is authenticated, it is true in the Boolean expression, and false otherwise. If any ACE in an ACL is true, then the ACL is true.

Figure 2:
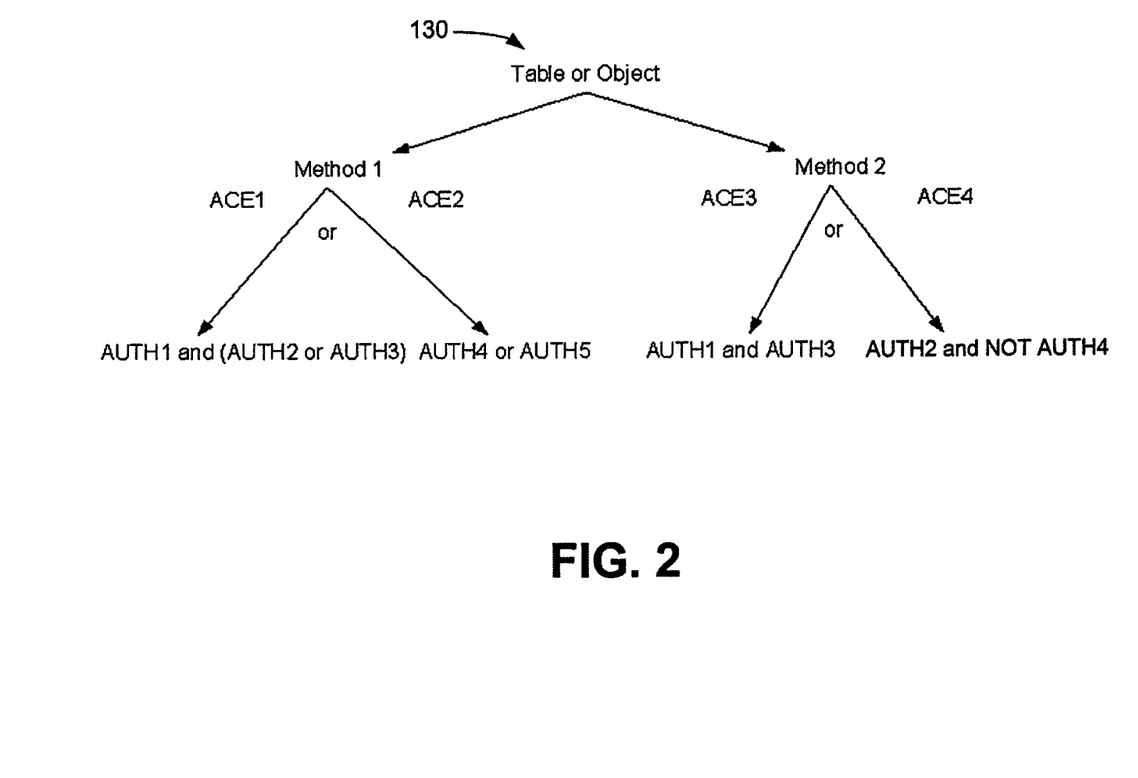
FIG. 2 is a diagram illustrating an example use of access control lists (ACLs) for methods operating on a peripheral device.

FIG. 2 is a diagram illustrating an example use of ACLs. At the top level, 130, a Table or Object in the SP identifies the Authentication Operations by which two Method Calls (Method 1 and Method 2) can be authenticated by the SP. For example, "Method 1" may have an ACL that lists ACE1 and ACE2. Thus, Method 1 may be authenticated by satisfying ACE1 or ACE2. As mentioned above, each ACE is a Boolean expression of one or more Authorities. In this example, ACE1 may be satisfied by "AUTH1 and (AUTH2 or AUTH3)", whereas ACE2 may be satisfied by "AUTH4 or AUTH5". Similarly, "Method 2" may have an ACL that lists ACE3 and ACE4, where ACE3 is satisfied by "AUTH1 and AUTH3", and ACE4 is satisfied by "AUTH2 and NOT AUTH4".

1.3 Authorities

The Authority Table on an SP associates specific Credential-Operation pairs together in Authority objects. For example, one Authority may include a credential that contains the secret password and the stipulated proof-of-knowledge Operation of password authentication. A host application Authenticates to the Authority. The Authority is the base level building block of access control system 120.

An Authority can be used by the host application to represent a person, a role, a program agent, etc. These are distinctions of meaning to the application, not to the SP.

Authorities come in two types: Individual and Class. An Individual Authority specifies one Credential (secret) and one Authentication Method (how to prove knowledge of that secret) for that Credential. Each Individual Authority may be a member of a Class Authority. A Class may also be a member of a Class. A Class Authority is identified only by its Class Name and Authority UID, for example. A Class Authority does not refer directly to a Credential.

A Class Authority is authenticated when an Individual Authority that is a member of that Class Authority is authenticated. Class Authorities cannot be directly authenticated. Class Authorities are a convenient way to allow an ACE to be set on a method without enumerating all the individual Authorities that may authorize that method. This means that the Individual Authorities that belong to that Class can be changed without having to change any of the ACEs that refer to the Class Authority.

1.4 Credentials

A Credential is an object in a Credential Table, noted by a name C_*, where "*" is a variable indicating a particular Authentication Operation. Each Credential Table is associated with a corresponding Authentication Operation and includes one or more of the proof of knowledge Credentials (such as a plurality of unique passwords or public-private key pairs) that can be proven by that Authentication Operation. It may have private parts and public parts, such as public keys and certificates. A particular Credential need not have all its columns filled in. For example, if only a public key and certificates validating that public key is known, then the private key may be absent. A Credential Table also has internal functions for using the secrets and the public parts of each credential and handles all optional parts.

1.5 Authentication Operation Types

The Authentication Operation is selected, as appropriate for the Credential. Examples of possible Authentication Operations include Password or PIN or Passcode;
Signing:
  Public Key Challenge/Response Sign/Verify
  Symmetric Key Challenge/Response Sign/Verify
  Hash MAC, or HMAC Challenge/Response Sign/Verify;

Key Exchange (Certificates or other methods provide implicit Authentication):
  Public Key Encrypt/Decrypt
  Symmetric Key Encrypt/Decrypt; and
None or " " This operation will always Succeed and therefore the Authority will always Authenticate.

Access control is permitted in that ACEs can apply to Methods on an SP, on a particular Table in an SP, or on arbitrary parts of a particular Table in an SP, down to the granularity of a single Table cell.

In an embodiment, Authentication to an Authority occurs within a session initiated between the host application and the peripheral device and applies only to that session, for example. During a session the host may make any number of Authenticate method calls.

2. IMPLEMENTATION OF ACCESS CONTROL FOR A PERIPHERAL DEVICE

Figure 3:
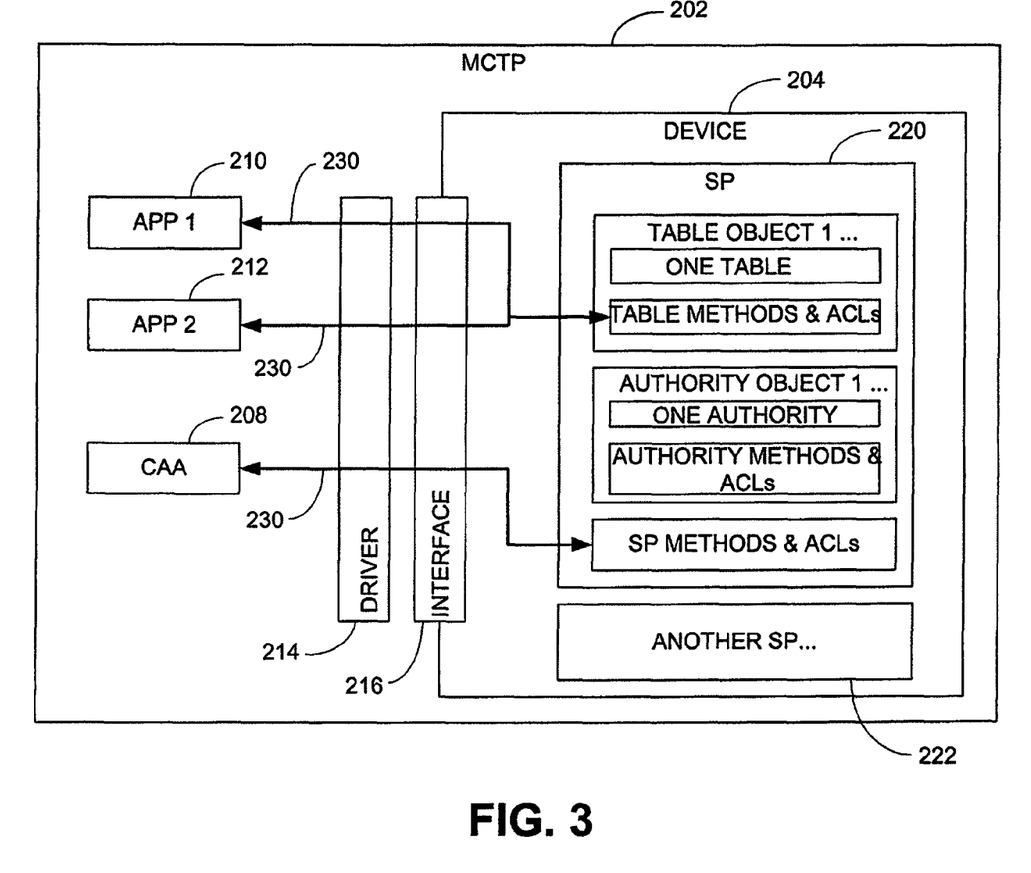
FIG. 3 is a block diagram of a multicomponent trusted platform having a trusted peripheral device with an access control subsystem according to an embodiment of the present invention.

FIG. 3 is a block diagram of a core architecture 200 for implementing an Access Control System as discussed above over a trusted peripheral device according to one embodiment of the present invention. FIG. 3 shows a single platform host 202 or Multicomponent Trusted Platform (MCTP). Host 202 keeps track of the peripherals through a Component Authentication Administrator (CAA) 208. Various host software applications, such as APP1 (labeled 210), APP2 212 (labeled), and CAA (labeled 208), may interact with a trusted peripheral 204 through a driver 214 and a peripheral interface 216. Trusted peripheral 204 includes a security provider (SP) 220, which includes an issued set of tables an methods that control a persistent trust state of the peripheral device.

In one embodiment, each row of a table is a security association, such as an association between a login name and a password, while each column names the parts of the association, such as "login_name" and "password". An Authority object is one such row in an Authority object table. A table that establishes a security association may have many different associations recorded as rows within it. Depending on the set of various tables, or personalization, specific authorities may have to Authenticate to perform specific methods on specific rows and columns of specific tables. Security provider SP 220 is a completely self-contained and stand-alone security domain of such tables. Peripheral device 204 may have more than one issued service provider, such as 220 and 222 dedicated to specific applications of host 202.

A security provider contains objects that are each composed of persistent data and methods (or remote procedure calls). In one embodiment, the methods, not the data, are bound to access control lists (ACLs). In the simplest case, there are two types of objects in an SP:

a. Table Objects, which establish methods and ACLs for arbitrary tables, b. Authority Objects, that specify passwords or cryptographic proofs that are required to prove knowledge prior to executing the methods in the SP or the associated objects.

In one embodiment, all trusted peripherals have at most one locking SP that allows manipulation security characteristics of the trust peripheral through its set of tables and access-control methods on the tables. In trusted peripherals that can issue new SPs, an Administrator SP can be used to manage multiple SPs.

Applications on host 202, including CAA 208 can query or change a persistent state by establishing sessions with an SP that execute one or more object methods (connectors 230 in FIG. 3).

Host 202 communicates with SP 220 by opening a session using the interface commands of the particular interface 216. In the simplest case, host 202 is the platform host to which the trusted peripheral is directly attached. In a more general case, host 202 could be some other platform host that communicates with an intermediate platform host, which relays the session stream to trusted peripheral 204 over a network.

Trusted peripheral devices that are capable of issuing new SPs may have SP templates from which the new SPs are created. SP templates define the initial tables and the methods that SPs that are based on them will have when issued. SP templates can combine to extend the functionality of the base SP template.

3. TABLES

3.1 General Description of Tables

In one embodiment, for example, the access control tables are the only persistent state for an SP. That is, the only data for an SP that persists past the end of a session is the data that is stored in the tables. The tables survive peripheral device reboots and operations on the non-secure areas of the device.

The access control tables can be stored (in whole or in part) in any physical memory device that is associated with the peripheral device 204. For example, the tables can be stored in SP-specific parts of a secure storage area of the device.

A table includes a grid with named columns and addressable rows. At each column and row intersection there is a cell. All the cells in a column have the same type. A table's size is determined when it is created, as the types of the columns and the maximum number of rows can be fully specified. However, the term "table" as used in the specification and claims can include any data structure or arrangement that can be used to associate two or more fields of data in memory. The "rows" and "columns" of the table refer to the manner in which the fields are associated with one another, not necessarily the physical arrangement of memory cells in which the fields are stored.

A table or table column name may be up to 18 bytes in length. By way of example only, the names used herein consist of ASCII characters, the first of which is be a letter and others being a letter, digit or underscore.

SPs may be issued and deleted. Within an SP, tables may be created and deleted. For each table, rows may be created and deleted (except within a Byte table—see below), but columns are created only when the table is created.

Each SP can have a set of metadata tables that completely describes all the tables of the SP including the metadata tables themselves.

Access control provides a means to limit what methods can be executed on tables or particular rows of tables.

3.2 Kinds of Tables

In one exemplary embodiment, there are four kinds of tables:

A Byte Table has one unnamed column of type uinteger$\{1\}$. This provides a raw storage abstraction. In one embodiment, the rows of this table cannot be allocated or freed.

An Array Table has rows that are addressed by an unsigned integer. The first row is 1, etc.

An Indexed Table has one or more columns designated as the index. Each row of the table has a unique and distinct index (has unique and distinct values in all indexed columns). The index is the only way to address a row.

An Object Table is a kind of Indexed Table. An Object Table always has a Name column. Its index is a single column with name "Name" and type bytes$\{max=18\}$. This is the name of the object and provides a fast way to find an object with a specified object type and name. An Object Table has columns for storing row (object)-specific ACLs. Each row (object) has its own ACLs based on who created the row (object) with an implicit row-restriction for the row containing the ACL.

Except for Byte tables:

a newly created table is initially empty and rows must be created before it can be used;

there is always an ID column of type uinteger$\{4\}$. Each row has a unique value in this column that is never shared with another row, and is never reused. New values are assigned when rows are created and old values are discarded when rows are deleted. The ID column may be an index column in an indexed (or object) table. The ID column is present to provide anti-spoofing capability.

4. ACCESS CONTROL TABLES

The following sections define the access control tables used in one embodiment of the present invention for implementing an embedded Access Control System. Additional tables and other table formats can be used in alternative embodiments. These tables are provided as examples only. In the following tables, new ID references (UIDREF) are used in all table-to-table links in order to prevent one object from being mistaken for another.

4.1 Method Tables (Indexed Table)

As mentioned above, Methods are bound to access control lists (ACLs), which list access control elements (ACEs) that define Boolean combinations of Authorities that are required to be proven before the Security Provider allows the Method to be executed.

Table 1 describes the columns of a Method Table, which can be used to associate a method with an ACL according to one embodiment of the present invention. The Method Table contains one row for each table and method.

TABLE 1

METHOD Table Description

| Column | Index | Type | Description |
| --- | --- | --- | --- |
| Type | Yes | uidref{Table} | Will be 0 for SP methods. For object methods this refers to the object table. |
| Name | Yes | name | The method name, in UTF-8 characters. |
| ID | | uid | Autoindex row identifier. |
| CommonName | | name | A convenient name that may be shared by several methods. May be null. |
| Program | | ref{Program} | Pointer to the encoding of the program to be executed for this method. Will be 0 for built-in methods. |

TABLE 1-continued

METHOD Table Description

| Column | Index | Type | Description |
|---|---|---|---|
| ACL | | access_control_list | The ACL for the method. |
| Log | | bytes{1} {none = 0, LogSuccess = 1, LogFail = 2} | Log to SP log whether this method succeeds for fails or both. This is a bit mask. |

As shown in Table 1, each row of the Method table identifies a method by a unique method identifier "UID" and associates that method with an access control list. The Method Table can also include a pointer to a Program to be executed for that method.

Figure 4:
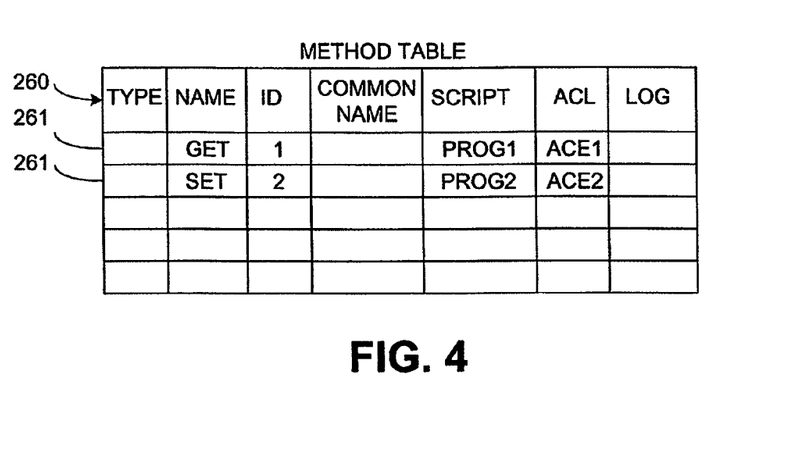
FIG. 4 illustrates a simplified visual example of a method table having the format shown in Table 1, according to an embodiment of the present invention.

FIG. 4 illustrates a simplified visual example of a method table 260 having the format shown in Table 1. Header 261 defines the columns for table 260. Method table 260 includes a plurality of rows 262 and 263. Each row identifies a particular method and an ACL for that method. In this example, row 261 defines that the Get method having ID=GET1 has an access control list with a single ACE, ACE1. Thus, the Credential and Authentication Operation defined by ACE1 must be Authenticated by the host in order to perform a GET method.

4.2 ACE Table (Object Table)

Table 2 defines the columns of an Access Control Element (ACE) table, according to one embodiment of the present invention.

TABLE 2

ACE Table Description

| Column | Type | Description |
|---|---|---|
| ID | uid | Unique autoindex ACE identifier. |
| Name | name | Name of ACE. |

TABLE 2-continued

ACE Table Description

| Column | Type | Description |
|---|---|---|
| BooleanExpr | access_control_element | The expression of Authorities and/or Authority Classes that authorizes the ACE if true. |
| RowStart | uinteger{2} | The first row restricting this ACE, if 0, the first row of the table. |
| RowEnd | uinteger{2} | The last row restricting this ACE, if 0, the last row of the table. |
| Colstart | name | The first column restricting this ACE, if null, the first column of the table. |
| ColEnd | name | The last column restricting this ACE, if null, the last column of the table. |

The ACE table has one row with each ACL element that may be Authenticated by the host. As mentioned above, the ACE table includes a column named "BooleanExpression", which provides an expression of the Authorities and/or Authority Classes that authorize the ACE, if true.

The default for rows and columns is all rows and all columns unless otherwise restricted.

4.3 Authority Table (Object Table)

Table 3 provides a description of the columns in each row of the Authority table, according to one embodiment of the present invention.

TABLE 3

AUTHORITY Table Description

| Column | Type | Description |
|---|---|---|
| ID | uid | Unique identifier of authority object. |
| Name | name | Name of the authority. |
| CommonName | name | Name common to several authorities |
| IsClass | boolean | If True, this is a Class Authority. If False, this an Individual Authority. |
| Class | uidref{Authority} | Optional. Designates the Class Authority this Authority participates in. |
| Enabled | boolean | If False, Authority is Disabled and Authentication automatically Fails. |
| Secure | boolean | True if authority requires secure messaging. This field is only used in establishing a secure session. |
| HashAndSign | hash_protocl | If not NONE, a signed hashs are to be used either during session creation or with session messaging. |
| PresentCertificate | boolean | If the Authority is a public key authority and if the credential contains a certificate chain, then present the certificate chain along with the authority. |
| Operation | authentication_method | What Operation to perform with the Credential (e.g., Exchange, Signing, SymK, HMAC, PIN, None) |
| CredentialTable | Credential | Which type of Credentials - a C_* table name, like C_RSA1024 selected from the publicly readable CryptoSuite Table in Admin. |
| Credential | uidref{credential} | Which specific Credential to use. |
| ResponseSign | uidref{Authority} | If present (non-zero), a required bilateral condition with another Authority |

TABLE 3-continued

AUTHORITY Table Description

| Column | Type | Description |
| --- | --- | --- |
| ResponseExch | uidref{Authority} | If present (non-zero), a required bilateral condition with another Authority |
| ClockStart | date | Authority is enabled starting on this date if the Peripheral device has a trusted date. No date signifies no start limit. |
| ClockEnd | date | Authority is disabled on this date if the Peripheral device has a trusted date. No date signifies no end limit. |
| Log | bytes{1} {LogSuccess = 1, LogFail = 2} | These flags enable logging of different events that occur when this authority is authenticated. Log = 0 is no logging. This logging is only applicable when authentications are done in establishing a session or in augmenting the authorities on it, not when authentication is tested on a method. |

Each row of the Authority table is an Authority. An Authority is a specific use of a Credential, and possibly other Authorities. A class Authority is a reference to multiple individual Authorities and cannot use a Credential.

Thus, each row (Authority) of the Authority table has a column named "Credential", which identifies a specific Credential to use for Authenticating proof of knowledge for this particular Authority and identifies a particular Authentication Operation by which the Credential is authorized.

The "Credential Table" column identifies the table name of the particular type of Credentials being used, and the "Credential" column identifies the specific row of the Credential Table that is being used. For example, if the Credential type is C_RSA1024, the Credential column of the Authority table specifies the particular row (particular key) of the C_RSA Credential table.

4.4 Certificate Data Tables (Byte Table)

Table 4 provides a description of the columns of a Certificate Data table, according to one embodiment of the present invention.

TABLE 4

CERTIFICATE DATA Table Description

| Column | Type | Description |
| --- | --- | --- |
| Code | certificate | Bytes of a certificate or trusted certificate chain. May use more than one contiguous row. X.509 as defined by the certificates requirements. |

The Certificate data table stores data that is used for data validating a public key, for example.

Certificates (Object Table)

Table 5 defines the columns of each row of a Certificates table. Each row has a Certificate name and a pointer to the Certificate's byte code.

TABLE 5

CERTIFICATES Table Description

| Column | Type | Description |
| --- | --- | --- |
| ID | uid | ID of Program |
| Name | name | Name of Certificate |
| Code | ref{CertificateData} | Pointer to the certificate's byte code. |
| CodeCount | uinteger{4} | Number of bytes actually used in the certificate. |

4.5 Credential Tables (Object Tables)

The following tables provide examples of different types of Credential tables that can be used in one or more embodiments of the present invention. These tables are not exclusive, and additional tables can be included to implement addition types of Credentials. In one embodiment, each Credential table is associated with a corresponding one of a plurality of proof of knowledge operations, called Authentication Operations.

The Credential tables represent an extensible basis for providing the public and private parts of Authentication mechanisms. Each Credential table represents a different mechanism and each row a different Authentication using the mechanism represented by the table.

The Credential tables contain secrets that might never need to leave the trusted peripheral. Normal ACEs can prevent disclosure of a secret from an attack that comes over the interface. To help protect against an attack in which the trusted peripheral electronics are changes, the Credential tables can have a Hide column to tell the trusted peripheral to hide the columns that contain secrets on the storage media. For example, the secrets can be Crytographically hidden on the storage media when possible.

4.5.1 C_PIN (Object Table)

Table 6 defines the columns of a PIN Credential table according to one embodiment of the present invention.

TABLE 6

C_PIN Table Description

| Column | Type | Description |
| --- | --- | --- |
| ID | uid | Unique identifier of the password. |
| Name | name | Name of the password. |
| PIN | password | Password string. |
| Hide | boolean | Cryptographically hide value on media when possible |
| TryLimit | uinteger{1} | Maximum number of failed tries before always failing. |
| Tries | uniteger{1} = 0 | Current number of failed tries. |

The Credential table PIN, C_PIN, contains one row for each Authority that requires a password. Table 6 provides a definition for each column of the C_PIN table. Each row of the C_PIN table contains a column named "PIN" that stores a password string for a particular Authority. The "HIDE" column can be used to cryptographically hide the password string on the storage media when possible.

The "Tries" column is updated by the peripheral device on every failed Authentication attempt, including the implicit Authentication attempt if the Authority is a Signing Authority invoked during a session startup. The "Tries" column is set to zero by the peripheral device when the Authenticate succeeds. Also, the tries column can be reset from the host by establishing an ACE for the Set method on that cell.

4.5.2 C_RSA_1024 (Object Table)

Table 7 defines the columns of a CRSA_1024 Credential table according to one embodiment of the present invention.

TABLE 7

C_RSA_1024 Table description

| Column | Type | Description |
|---|---|---|
| ID | uid | Unique identifier. |
| Name | name | Name. |
| CryptoCall | name = RSA | Crypto Type |
| CryptoLen | uinteger{2} = 1024 | Length of Key |
| Pu_Exp | uinteger{10} | RSA Public Exponent |
| Pr_Exp | uinteger{10} | RSA Private Exponent |
| Mod | uinteger{10} | Modulus |
| P | uinteger{10} | p and q, the primes from the key generation, |
| Q | uinteger{10} | |
| Dmp1 | uinteger{10} | d mod (p-1) and d mod (q-1) (often known as dmp1 and dmq1) |
| Dmq1 | uinteger{10} | (1/q) mod p (often known as iqmp) |
| Hide | boolean | Cryptographically hide value on media when possible |
| ChainLimit | uinteger{1} | The chaining Limit for using a chained down key from this one. −1 indicates no limit. 0, no chain, is the default. |
| Certificate | uidref{Certificate} | Certificate(s) - provides a chained set of unencoded X.509 certificates if needed to prove an ancestor authority |

Table 7 implements an RSA Laboratories public-key cryptosystem having a key length of 1024 bytes. The public exponent and the private exponent columns of the RSA table represent a public-private key pair for each row of the table. Again, the column containing secrets such as the RSA private exponent, modulus, P and Q primes, DMP1 and DMQ1 and IQMP can be hidden on the medium.

4.5.3 C_RSA_1048 (Object Table)

Table 8 defines the columns of a C_RSA_2048 Credential table according to one embodiment of the present invention.

TABLE 8

C_RSA_2048 Table Description

| Column | Type | Description |
|---|---|---|
| ID | uid | Unique ID. |
| Name | Name | Name. |
| CryptoCall | name = RSA | Crypto Type |
| CryptoLen | uinteger{2} = 2048 | Key Length |
| Pu_Exp | uinteger{20} | Public Key |
| Pr_Exp | uinteger{20} | Private Key |
| Mod | uinteger{20} | Modulus |
| p | uinteger{10} | p and q, the primes from the key generation, |
| q | uinteger{10} | |
| Dmp1 | uinteger{10} | d mod (p-1) and d mod (q-1) (often known as dmp1 and dmq1) |
| Dmq1 | uinteger{10} | (1/q) mod p (often known as iqmp) |
| Hide | boolean | Cryptographically hide value on media when possible |
| ChainLimit | uinteger{1} | The chaining Limit for using a chained down key from this one. −1 indicates no limit. 0, no chain, is the default. |
| Certificate | uidref{Certificate} | Certificate(s) - provides a (possibly chained) set of unencoded X.509 certificates if needed to prove signing from an ancestor authority |

Table 8 implements an RSA public-key cryptosystem having a key length of 2048 bytes.

4.5.4 C_ES_160 (Object Table)

Table 9 defines the columns of a C_EC_160 Credential table according to one embodiment of the present invention.

TABLE 9

C_EC_160 TABLE DESCRIPTION

| Column | Type | Description |
|---|---|---|
| ID | uid | Unique identifier. |
| Name | name | Name. |
| CryptoCall | name = EC | Crypto Type |
| CryptoLen | uinteger{2} = 160 | Key Length |
| Hide | boolean | Cryptogaphically hide value on media when possible |
| p | uinteger{20} | Modulus |
| r | uinteger{20} | Order of the curve |
| b | uinteger{20} | Curve coefficient (y2 = x3 − 3x + b mod p) |
| x | uinteger{20} | Base point coordinate |
| y | uinteger{20} | Base point coordinate |
| alpha | uinteger{20} | Private key |
| u | uinteger{20} | Public key x-coord: (x, y) · α \| x |
| v | uinteger{20} | Public key y-coord: (x, y) · α \| y |
| ECDSAs | uinteger{20} | Hash Initialization Vector |
| ECDSAc | uinteger{32} | Hash Message Block (PseudoRNG) |
| ECDSAHash | enum{Plus-1x, SHA-1, SHA-256} | Hash to ECDSA |
| MQVHash1 | enum{Plus-1x, SHA-1, SHA-256} | |
| MQVHash2 | enum{Plus-1x, SHA-1, SHA-256} | |
| ChainLimit | uinteger{1} | The chaining Limit for using a chained down key from this one. −1 indicates no limit. 0, no chain, is the default. |
| Certificate | uidref{Certificate} | Certificate(s)-provides a (possibly chained) set of unencoded X.509 certificates if needed to prove signing from an ancestor authority |

Table 9 is an example of a Credential Table for implementing an elliptical curve cryptography.

4.5.5 C_AES_128 (Object Table)

Table 10 defines the columns of a C_AES_128 Credential table according to one embodiment of the present invention.

TABLE 10

C_AES_128 Table Description

| Column | Type | Description |
|---|---|---|
| ID | uid | Unique identifier. |
| Name | name | Name |
| CryptoCall | name = AES | Crypto Type |
| CryptoLen | uinteger{2} = 128 | Key Length |
| Key | uinteger{16} | Key |
| Hash | hash_protocol | When hashing is required, this selects the hashing algorithm. |
| Hide | boolean | Cryptographically hide value on media when possible |

Table 10 implements an advanced encryption standard having a 128-byte symmetric key. Again, the key can be cryptographically hidden on the media when possible.

As mentioned above, the access control tables, such as the Method Table, Ace Table, Authority Table, the set of Credential Tables, and other related tables, of each SP of a peripheral device are stored (in whole or in part) in a physical memory device that is associated with or accessible by the peripheral device. The host will include a similar set of Authority and Credential Tables for the SP's it wishes to access. These tables can be stored in whole or in part in any memory that is associated with or accessible by the host. The information stored in the host's Authority Table and Credential Tables, however, might contain only part of the information stored in the SPs Tables. For example the host Credential Table might include only a public part of a public-private key pair. This allows the host to request the correct Authority Operation and provide a corresponding Credential for review by the SP in the peripheral.

5. SESSION

In one embodiment of the present invention, all communications with an SP occur during a session. A session is always started by a host, for example. Normally the host application will end a session when it has finished its communication, but either the SP or the host can abort a session at any time for any reason. For a specific SP there can be any number of read sessions active simultaneously, but only one write session, for example. Read and write sessions are mutually exclusive. The implementation may limit the number of simultaneous read sessions to any SP and/or limit the total number of open sessions available to a peripheral device.

Methods are procedures that operate on tables or SPs, and are called within a session to an SP. The caller passes a list of parameter values to the method and the method returns a list of result values followed by a uinteger status code. Within a given session at most one method can be active at a time. Each session to an SP has at least two streams of bytes onto which data is encoded. One stream goes from the host to the SP, and the other comes from the SP to the host.

Method calls, their parameters, and their results are sent and received over session streams. Each stream operates asynchronously from all other streams. Typical host method calls will send all their parameters/data to the SP before trying to read any of the results, but the SP is free to generate results incrementally as it consumes its parameters. The host is similarly free to try to read SP results while sending parameters.

The SP implementation decides how synchronous or asynchronous to be, so long as the semantics of the method call(s) are not compromised.

Transactions are used to provide a clean model for how changes to an SP are to take effect. They also provide an easy way for host applications to handle error recovery. All changes to an SP take place within the scope of a transaction. When a session is opened to the SP a transaction is automatically started. When the session is closed, that transaction is closed. If the session is aborted, the transaction is aborted. If the session is closed successfully, the transaction is committed to persistent storage. Only when a session is closed and committed are its changes made persistent (to the media, made visible to subsequent sessions on the same SP, etc.). Any effects on other aspects of the peripheral device (i.e. hardware settings) do not happen until and unless the session is successfully committed. If a session is ended before nested transactions are closed (committed or aborted), then all the transactions are aborted and the session is aborted.

A method call includes of the following steps:
a. The host tells the SP the method it wants to call;
b. The host sends a list of parameters to the SP;
c. The body of the method is executed in the SP; and
d. The method results are returned from the SP to the host.

Steps 2-4 may be repeated when input and output are incrementally streamed.

Starting a session depends upon three independent requirements, for example:
a. The peripheral device and the requested SP having sufficient resources;
b. Negotiating symmetric keys if secure messaging is required; and
c. Authenticating requirements (one of the following, for example):
   Host must authenticate to SP;
   SP must authenticate to Host;
   Both of the above; and
   None of the above (No authentication).

The first requirement, sufficient resources, is often time-dependent, so if a session fails to start for this reason a short delay may be necessary before retrying. The host sets the second and third requirements when it attempts to start the session, as described below.

The Host application starting the session determines the secure messaging and authentication requirements to be satisfied by specifying up to four authorities, for example:
HostExchangeAuthority: Host's Exchange Key—and implicit authentication
HostSigningAuthority: Host's Signing Key—used for authenticating the host to the SP
SPExchangeAuthority SPs Exchange Key—and implicit authentication
SPSigningAuthority: SPs Signing Key—used for authenticating the SP to the host.
Note: These authorities are already known to the SP.

Host authorities, if used, are passed in the StartSession method call. SP authorities are bilateral authorities called out in the Host authorities' Authority table rows. The ability to specify authorities in the StartSession method call, coupled with the linking of authorities in the Authority table, provides a large and diverse set of possible session protocols, including secure messaging. It is the initial selection of authorities by the host that determines which protocol is to be followed.

When the host makes a StartSession method call it knows which SPExchangeAuthority and SPSigningAuthority (if any) the SP will use. Those may be the root authorities in a certificate chain whose ultimate effective authority the host does not know. This is why the SP may return certificates to the host as part of a SyncSession.

If a HostSigningAuthority or SPSigningAuthority requires a Challenge-Response, as is the case for PuK, SymK, and HMAC authorities, or if secure messaging is to be used (or both), then the StartSession and SyncSession methods are followed by StartTrustedSession and SyncTrustedSession methods.

An authority (HostExchangeAuthority, SPExchangeAuthority, HostSigningAuthority, or SPSigningAuthority) that is also a Public Key Authority (an Authority with public key credentials—PuK) may have additional information supplied for it in the form of a Certificate or Certificate chain. In this case the Effective Authority (the one responding to the challenge) will be the tail PuK of that chain. The effective authority is transient to the session. An effective authority transmitted to the SP, the full contents of its certificate chain, will be available only during the session. In one embodiment, it is necessary to create a new authority on the SP (in a write session) if the host wants that authority to persist past on the SP.

Seven examples from among the many possible ways to start a session include:
a. None. No Authorities are used. This is a non-authenticated, non-secure messaging session.
b. Host-PIN. This is the rudimentary case of passcode authentication that is passed in the clear. Secure messaging is not an option in this case.
c. SP-SymK-Exch. The simplest case that provides for full Host & SP session key encryption. The SP needs to perform only symmetric encryption.
d. Full-PuK. This uses public keys for signing and key exchange, for both the Host application and the SP. With a proper certificate chain or other validation proof for the exchange key, this is also authenticated. SP Issuance is an example where Full-PuK is used.
e. Full-SymK. This uses SymK keys for signing and key exchange, for both the Host application and the SP.
f. Host-PuK-Authentication. This is a simple strong enabler that does not start up secure messaging. An example use case might be a TCG TPM that authenticates a session in order to unlock the Read/Write functions of a disk drive and, because of the nonce and the private key, does not need a secure channel.
g. Host-PuK-SP-SymK. This is a case where it is desired that the SP sign, but that public key signing, and indeed all the private key operations of public key cryptography, are deemed too computationally expensive for the SP. The Host application is allowed to PuK sign and the SP to PuK verify and PuK encrypt a session key. But the SP only SymK signs, and does SymK session key receipt.

6. EXAMPLE

Figure 5:
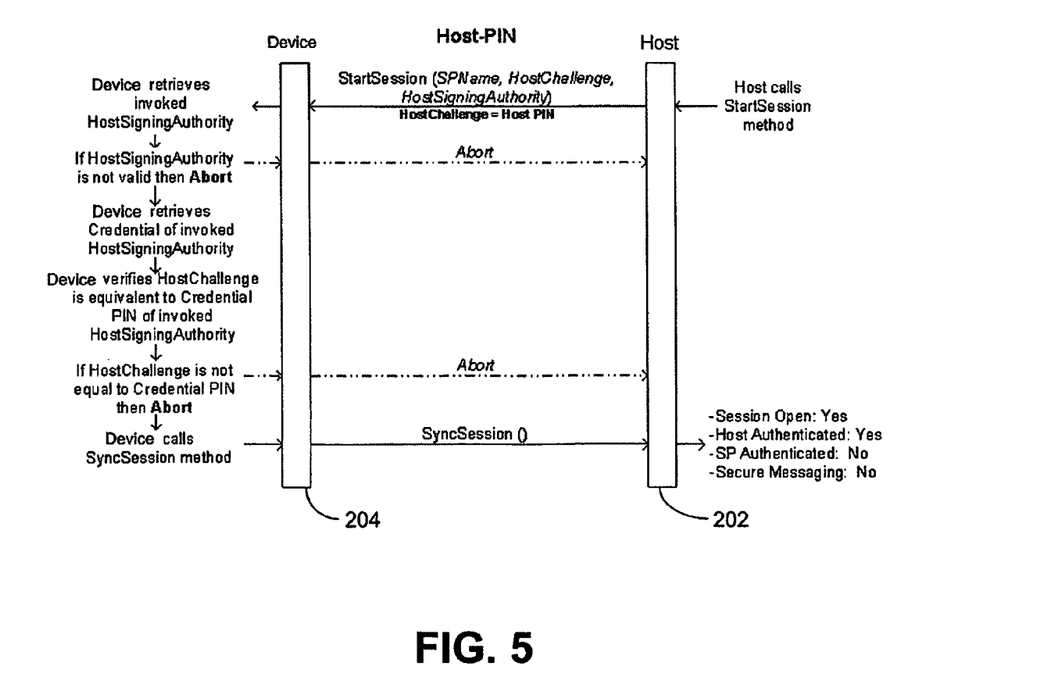
FIG. 5 is a diagram illustrating an example of a session implementing pass code authentication between a host and a peripheral device.

FIG. 5 is a diagram illustrating an example of a session implementing pass code authentication between host 202 and peripheral device 204. For clarity only the security related parameters are shown in FIG. 5. The host begins communication with peripheral device 202 by calling a StartSession method and passing parameters, including an SPName, a HostChallenge and a HostSigningAuthority. In this case, the HostChallenge includes the host PIN.

The peripheral device receives the method call, looks in the Method Table (e.g., Table 1 above) of the named SP (SPName) to identify the ACL for that method and identifies the resulting ACE and its Boolean expression of Authorities from the ACE Table (Table 2 above). If the HostSigningAuthority is not valid (i.e., not satisfying the Boolean combination of Authorities in the identified ACE Table), the peripheral device aborts the session.

If valid, the peripheral device identifies the associated Credential of the invoked HostSigningAuthority from the Authority Table (e.g., Table 3 above) and retrieves the identified Credential from the associated Credential Table (e.g., Table 6 above). The peripheral device verifies that the HostChallenge (e.g., PIN) is equivalent to the Credential PIN of the invoked HostSigningAuthority. If not, the peripheral device aborts the session. If so, the peripheral device authorizes the called method, such as by calling a SyncSession method.

7. CONCLUSION

The access control system can be implemented wholly or partly on any computer-readable media and can comprise one or more instructions or databases that are resident at various times in various memory and storage devices associated with the peripheral device and/or the host. When read and executed by the host or peripheral device the instructions cause the host or device to perform the instructions and/or process the databases or tables embodying the various aspects of the invention. Examples of computer readable media on which such instructions, tables, objects and/or modules can be stored include but are not limited to recordable type media such as volatile and nonvolatile memory devices, floppy and other removable discs, hard disc drives, optical discs, e.g., CD-ROMs, DVDs, etc., among others, and transmission type media such as digital and analog communication links.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the access control system while maintaining substantially the same or similar functionality without departing from the scope and spirit of the present invention. In addition, although the embodiments described herein are directed to an access control system for a peripheral device, it will be appreciated by those skilled in the art that the teachings of the present invention can be applied to any device for which access to a resource or feature of the device is controlled, without departing from the scope and spirit of the present invention.

What is claimed is:

1. An access control system, comprising:
   multiple credential tables, each credential table associated with a corresponding proof of knowledge operation and includes one or more proof of knowledge credentials that can be proven by the associated proof of knowledge operation;
   an authority table identifying a plurality of authorities, each authority associating at least one proof of knowledge operation with at least one of the multiple credential tables;
   an access control element table, which identifies a plurality of access control elements, and for each access control element identifies a Boolean combination of the authorities for that access control element; and
   at least one access control list, which identifies two or more access control elements by which a specific method to be executed can be authenticated.

2. The access control system of claim 1, wherein the plurality of authorities, the plurality of access control elements and the access control list are maintained by firmware embedded within a peripheral device for which access is controlled by the system.

3. The access control system of claim 1 and further comprising:
   a method table including a plurality of methods and for each method, identifies one of a plurality of access control lists by which that method can be authenticated.

4. The access control system of claim 3 wherein for each method, the method table further comprises a pointer to a program to be executed for that method.

5. An access control system comprising:
   a method table including a plurality of methods that can be executed when a request to execute a method is authenticated, the method table identifying for each method an access control list by which a method can be authenticated;
   an access control list including a plurality of access control elements,
   an access control element table, which identifies a plurality of access control elements, and for each access control element identifies a Boolean combination of more than one authority for that access control element; and
   an authority table including more than one authority, where each authority associates at least one authentication operation with at least one credential;
   a plurality credential tables, each includes one or more authentication credentials that can satisfy the associated authentication operation;
   wherein the request to execute the method is allowed when an authentication operation is satisfied, where the authentication operation satisfies the Boolean combination of more than one authority identified by an access control element and where the access control element is included in an access control list indicated in a method table listing the method.

6. The access control system of claim 5 further comprising:
   the plurality of credential tables, where each credential table is associated with a corresponding authentication operation and comprises the plurality of credentials that satisfy the corresponding authentication operation.

7. The access control system of claim 5, wherein the credential table, the authority table and the access control element table are maintained by firmware embedded within a peripheral device for which access is controlled by the system.

8. A method comprising:
   maintaining a plurality of credentials that can satisfy an associated authentication operation;
   maintaining a plurality of authorities, each authority associating at least one of a plurality of authentication operations with at least one of a plurality of authentication credentials; and
   maintaining a plurality of access control elements, each access control element identifying a Boolean combination of at least one of the authorities, the plurality of authorities and the plurality of access control elements being maintained within a memory associated with a device for which access is controlled; and
   maintaining an access control list including a plurality of access control elements.

9. The method of claim 8 wherein the plurality of authorities and the plurality of access control elements are embedded at least in part within firmware of the device.

10. The method of claim 8 and further comprising:
maintaining a credential table, which comprises a plurality of the authentication credentials that can be proven by at least one of the plurality of authentication operations.

11. The method of claim 10, wherein maintaining a credential table comprises:
maintaining a plurality of credential tables, where each credential table is associated with a corresponding one of the plurality of authentication operations and comprises the plurality of the authentication credentials that can be proven by that authentication operation.

12. The method of claim 8, wherein maintaining a plurality of authorities comprises:
maintaining an authority table, which identifies the plurality of authorities and for each authority, associates one of the authentication operations with one of the authentication credentials.

13. The method of claim 8, wherein maintaining a plurality of access control elements comprises:
maintaining an access control element table, which identifies the plurality of access control elements and for each access control element identifies the Boolean combination of at least one of the authorities.

14. The method of claim 8 and further comprising:
maintaining a method table, which identifies a plurality of methods that can be executed, and for a method identifies multiple access control elements by which that method can be authenticated.

15. A computer readable storage device comprising instructions, which when executed by a computing device cause the computing device to perform a method comprising:
maintaining a plurality of credentials that can satisfy an associated authentication operation;
maintaining a plurality of authorities, each authority associating at least one authentication operation with at least one authentication credential that defines at least one requirement for the authentication operation to be satisfied;
maintaining a plurality of access control elements, each access control element identifying a Boolean combination of the authorities that can be satisfied to authenticate a method;
maintaining an access control list including a plurality of access control elements, the access control list identifying multiple access control elements by which at least one method can be authenticated; and
maintaining a method table to associate a method with at least one access control element, where the method is allowed to be executed when an associated access control element is satisfied.

* * * * *